United States Patent
Bhattacharyya et al.

(10) Patent No.: US 11,276,017 B2
(45) Date of Patent: Mar. 15, 2022

(54) METHOD AND SYSTEM FOR ESTIMATING EFFORTS FOR SOFTWARE MANAGED SERVICES PRODUCTION SUPPORT ENGAGEMENTS

(71) Applicant: Tata Consultancy Services Limited, Mumbai (IN)

(72) Inventors: Pranabendu Bhattacharyya, Kolkata (IN); Parag Saha, Kolkata (IN); Dipanjan Ghosal, Kolkata (IN); Paramita Mandal Dutta, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 495 days.

(21) Appl. No.: 16/109,002

(22) Filed: Aug. 22, 2018

(65) Prior Publication Data
US 2020/0065733 A1 Feb. 27, 2020

(51) Int. Cl.
*G06Q 10/06* (2012.01)
*G06F 8/77* (2018.01)

(52) U.S. Cl.
CPC ....... *G06Q 10/06315* (2013.01); *G06Q 10/06* (2013.01); *G06Q 10/0633* (2013.01);
(Continued)

(58) Field of Classification Search
CPC combination set(s) only.
See application file for complete search history.

(56) References Cited

U.S. PATENT DOCUMENTS 8,006,223 B2 * 8/2011 Boulineau ........ G06Q 10/06313 717/101
8,407,080 B2 3/2013 Jayaraman et al.
(Continued)

FOREIGN PATENT DOCUMENTS

CA 2404847 A1 * 3/2003 ............. G06Q 10/06
CA 2564882 A1 * 11/2005 ....... G06Q 10/06315

OTHER PUBLICATIONS

J. Lee et al. "Service cost estimation for packaged business application-based business transformation," 2008 IEEE International Conference on Service Operations and Logistics, and Informatics, 2008, pp. 890-895, doi: 10.1109/SOLI.2008.4686525. (Year: 2008).*

*Primary Examiner* — Crystol Stewart
(74) *Attorney, Agent, or Firm* — Finnegan, Henderson, Farabow, Garrett & Dunner LLP

(57) ABSTRACT

The present disclosure provides a method and system that estimates size, effort and FTE of software Managed Services Production Support (MS-PS) engagements. It provides a method and system to categorize all applications in various bundles based on multiple parameters. Further the invention provides a method and system to estimates size of each bundle at an application level based on a set of variables. Further, the invention provides a method and system for utilizing the estimated MS-PS engagement size and organizational baseline productivity information for estimating the MS-PS engagement base effort which can then be adjusted based on multiple factors to arrive at the final effort. It estimates full time equivalent (FTE) of the MS-PS engagement using the final estimated effort of the applications and additional FTE impacting parameters. The invention furthermore provides a method and system to optimize the estimated FTE for a bundle and view the overall unutilized effort.

11 Claims, 2 Drawing Sheets

(52) U.S. Cl.
CPC ... *G06Q 10/0639* (2013.01); *G06Q 10/06313* (2013.01); *G06Q 10/06393* (2013.01); *G06F 8/77* (2013.01)

(56) References Cited

U.S. PATENT DOCUMENTS

| | | | |
|---|---|---|---|
| 8,731,991 B2* | 5/2014 | Altuwaijri | G06Q 10/06 705/7.23 |
| 9,886,262 B2* | 2/2018 | Thomas | G06Q 10/00 |
| 2005/0033624 A1* | 2/2005 | Dixon | G06Q 10/06314 705/7.24 |
| 2006/0161879 A1* | 7/2006 | Lubrecht | G06Q 10/06 717/101 |
| 2008/0092120 A1* | 4/2008 | Udupa | G06F 11/3696 717/124 |
| 2008/0126271 A1* | 5/2008 | Zanlongo | G06Q 30/06 705/400 |
| 2008/0249825 A1 | 10/2008 | Kunjur et al. | |
| 2009/0319316 A1* | 12/2009 | Westerfeld | G06Q 10/06 705/319 |
| 2010/0070325 A1* | 3/2010 | Parthasarthy | G06Q 10/0639 705/7.38 |
| 2011/0066466 A1* | 3/2011 | Narayanan | G06Q 10/0637 705/7.36 |
| 2011/0106575 A1 | 5/2011 | Allam et al. | |
| 2012/0059680 A1 | 3/2012 | Guthrie et al. | |
| 2012/0253890 A1 | 10/2012 | Paliwal et al. | |
| 2014/0089887 A1* | 3/2014 | Bhattacharyya | G06Q 10/06 717/102 |
| 2015/0006211 A1* | 1/2015 | Santos | G06Q 10/0631 705/7.12 |
| 2015/0301698 A1* | 10/2015 | Roques | G06Q 10/06 715/736 |
| 2016/0173692 A1* | 6/2016 | Wicaksono | G06Q 10/067 379/265.03 |

\* cited by examiner

METHOD AND SYSTEM FOR ESTIMATING EFFORTS FOR SOFTWARE MANAGED SERVICES PRODUCTION SUPPORT ENGAGEMENTS

TECHNICAL FIELD

The embodiments herein generally relates to a system and method for estimating size, effort and people or full time equivalents (FTEs) of managed services production support engagements and, more particularly, the system and method for estimating required effort and FTEs for multi-application support engagements.

BACKGROUND

In the present scenario, there is dearth of effective estimation techniques in the managed services production support engagements dealing with support and maintenance of multiple applications in the information technology (IT) industry. Turnaround time of the estimation process is significantly high for the existing templates. Further, in the existing templates, there is high people dependency in absence of any standard set of rules and guidelines. It seems that the existing state of the art possess various challenges while estimating the managed services production support engagements.

In addition to this, the existing state of the art also requires skilled resources from different domains/applications to arrive at one estimate and it becomes a challenge to gather and consolidate all on same ground. The problem with estimation is further compounded during proposal submission where the requirements are available only at a very high level.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In one aspect of the present disclosure, a system is provided for estimating Full Time Equivalent(s) (FTEs) of managed services production support (MS-PS) engagements. The system comprises a memory, a processor, a receiving module, a categorization module, a size estimation module, an effort estimation module, and a FTE estimation module. The receiving module configured to receive one or more tickets of each application at a predefined time interval of a plurality of applications of the one or more managed services production support engagements, the categorization module configured to categorize the received one or more tickets of each application of the plurality of applications into one or more application bundles based on one or more predefined set of parameters, the size estimation module configured to estimate size of each application bundle of the one or more application bundles of the managed services production support engagements based on a complexity distribution of one or more tickets, a normalized size computation and weightage allocation to each ticket of one or more application bundles, the effort estimation module configured to estimate efforts for one or more managed services production support engagements and the FTE estimation module configured to estimate FTE count for one or more managed services production support projects using the estimated size of each application and the estimated effort for one or more managed services production support engagements, service level agreement (SLA) of each application and one or more steady state factors and one or more transient state factors as applicable for each application.

In another aspect of the disclosure, a non-transitory computer readable medium storing one or more instructions which when executed by at least one processor on a system, cause the at least one processor to perform method for estimating FTEs count for one or more managed services production support engagements, the one or more instructions comprising receiving one or more tickets of each application at a receiving module at a predefined time interval of a plurality of applications of the one or more managed services production support (MS-PS) engagements, categorizing the received one or more tickets of each application of the plurality of applications into one or more application bundles at a categorization module based on one or more predefined set of parameters, estimating size of each application bundle of the one or more application bundles of the managed services production support engagements at a size estimation module based on a complexity distribution of one or more tickets, a normalized size computation and weightage allocation to each ticket of one or more application bundles, estimating efforts for one or more managed services production support engagements at an effort estimation module, and estimating FTEs count for one or more managed services production support projects at the FTE estimation module using estimated size of each application and the estimated effort for one or more managed services production support engagements, service level agreement (SLA) of each project and one or more steady state factors and one or more transient state factors as applicable for each application.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
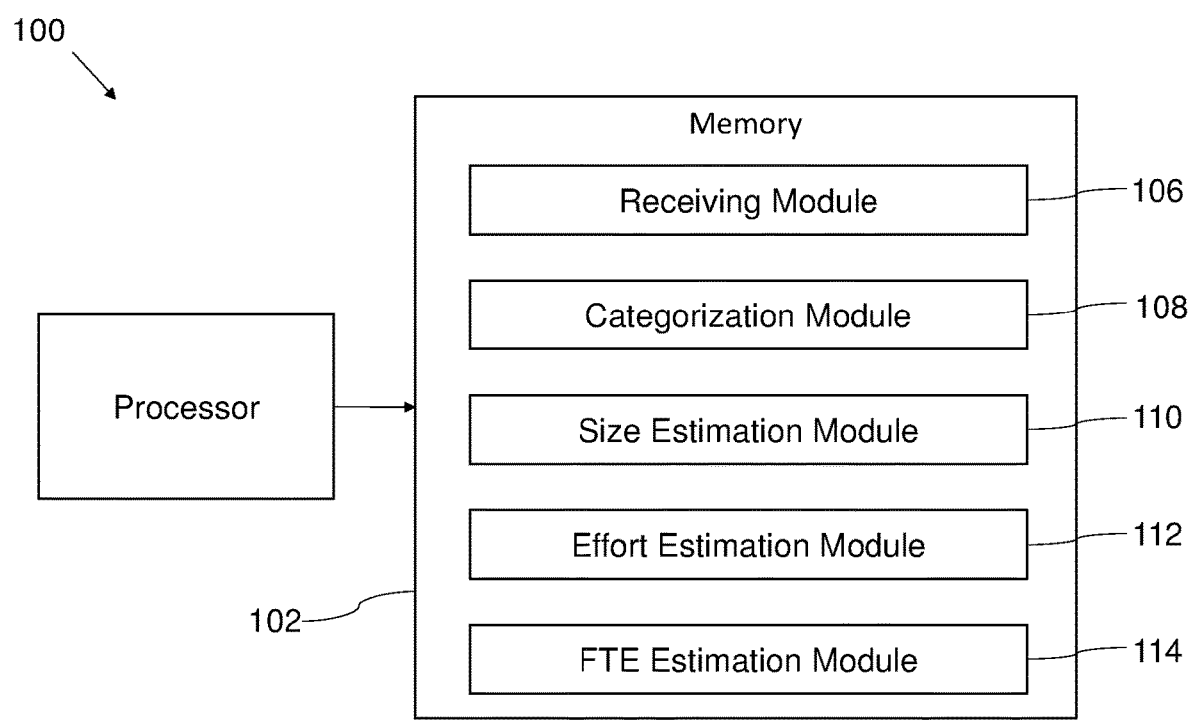
FIG. 1 illustrates a system that estimates size, effort and FTE of software Managed Services Production Support (MS-PS) engagements according to an embodiment of the present disclosure.
Figure 2:
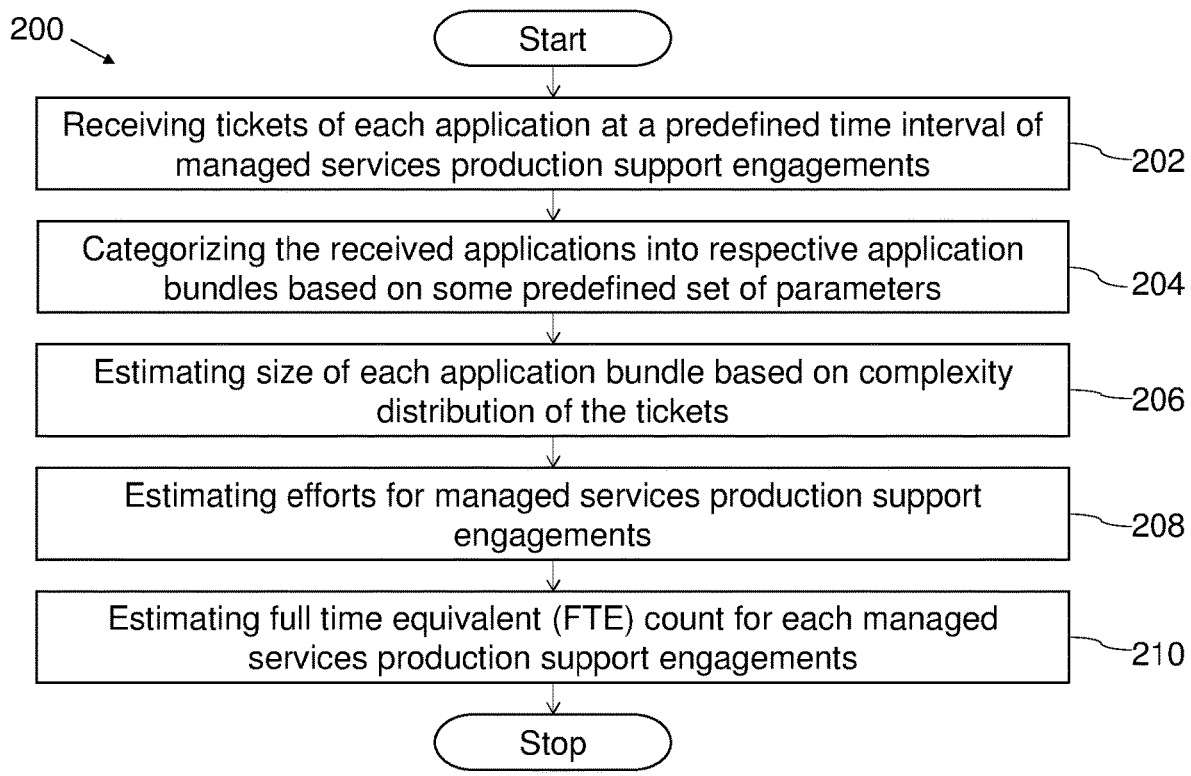
FIG. 2 is a flowchart that estimates size, effort and FTE of software Managed Services Production Support (MS-PS) engagements according to an embodiment of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

Referring FIG. 1, a system (100) for estimating size, effort and people or Full time equivalent (FTE) of managed services production support (MS-PS) engagements. The system (100) comprises a memory (102) with one or more instructions and a processor (104), wherein the processor (104) is communicatively connected with the memory (102) to execute the one or more instructions. Further, the system (100) comprises a receiving module (106), a categorization module (108), a size estimation module (110), an effort estimation module (112), and a FTE estimation module (114). The system (100) receives one more tickets of each application of managed services production support (MS-PS) engagements and categorizes the received one or more tickets into one or more application bundles based on one or more set of parameters. It is to be noted that the size of managed services production support engagements is represented in terms of production support points (PSP).

In the preferred embodiment of the disclosure, the receiving module (106) of the system (100) is configured to receive one or more tickets of each application of a plurality of applications of the one or more managed services production support engagements at a predefined time interval.

In the preferred embodiment of the disclosure, the categorization module (108) of the system (100) is configured for categorizing the received one or more tickets into one or more application bundles based on one or more predefined set of parameters. The one or more application bundles refer to specific groups or buckets of applications that can be clustered together based on various business/technology stack or portfolios of the organization. Once the one or more application bundles are created, the name of each application along with its brief description is listed. It is followed by the input of average number of tickets for a definite time period. It would be appreciated that the tickets are being distributed in terms of very simple, simple, average, and complex. If in a particular case, the ticket distribution criteria is not given, the system (100) will provide a default distribution.

It would be appreciated that the normalized size is derived from the one or more tickets (a number of incidence) to be handled by the engagement within a definite time. In an example, where the specified weight ratio assigned to the four categories of tickets are predefined in the order of 0.2:1:2:4 for a very simple, simple, average and complex category of tickets of the managed services production support engagements respectively. The normalization is done for following four categories of one or more tickets:
1. Very simple: Wherein the turnaround time is approximately around 1 hour or the support can be given through email, over phone or fax, and on chat.
2. Simple: Wherein the turnaround time is approximately around 4-6 hours.
3. Average: Wherein the turnaround time is approximately around 10-12 hours.
4. Complex: Wherein the turnaround time is approximately around 2-3 days.

It is to be noted that in cases, wherein the user does not have the ticket distribution, a default distribution of 6:3:1 for simple, average and complex category of tickets to be assumed.

In the preferred embodiment of the disclosure, the size estimation module (110) of the system (100) is configured for estimating size of each application of one or more application bundles. The size of each application bundle is estimated based on a complexity distribution of the one or more tickets, computation of normal size of each ticket and weightage allocation to each ticket of one or more application bundles. The size estimation module (100) provides application wise normalized size in productivity support points (PSP).

In the preferred embodiment of the disclosure, the effort estimation module (112) of the system (100) is configured for estimating efforts for one or more managed services production support (MS-PS) engagements based on the estimated size of the one or more managed services production support engagements and productivity of a team. The effort is calculated in Person Hours and the productivity of the team is expressed in terms of size (PSP) delivered per person hour.

Further, the productivity of the team depends on primary productivity determining factors and secondary productivity determining factors. The primary productivity determining factors depend on the application platform being supported. Some of the possible application platform includes a client server, a mainframe or legacy, a web based, an enterprise resource planning (ERP) or a package.

The secondary productivity determining factors depend on the attributes of the organization providing support such as incident resolution process & tool maturity, presence of technology experts, change management process and tool maturity, impact of known errors database, level of documentation available on applications, systems, and processes.

Furthermore, the overall effort estimation considers the additional effort due to static factors, common factors, project specific characteristics and risk factors in Person Hours. The effort of the static factors must be considered in terms of absolute effort in Person Hours. For the other factors, namely common factors, project specific characteristics and risk, the effort is considered as a percentage of the base effort. The total adjusted effort arising out of the effort adjustment is apportioned into different applications in the ratio of their base efforts. It would be appreciated that these factors are only considered at the application level, however, the effort estimation module (112) also considers one or more factors which impact only at the application bundle level, such as a change request (CR), a database monitoring system and a system monitoring.

In another embodiment, the FTE estimation module (114) of the system (100) is configured for estimating FTE count for one or more managed services production support applications using total adjusted effort for one or more managed services production support applications, service level agreement (SLA) of each applications and one or more steady state factors and one or more transient state factors as applicable for each application or application bundle. The one or more steady state factors including but not limited to number of working days per year, number of days spent in training and holidays per year, effective working hours of each FTE per day, and expected support window as applicable for the application to be supported. Further, the one or more transient state factors including but not limited to business or technology experience of one or more persons of a support team, number of applications of considerably larger size, necessity of multi-location support to the application, application stability and number of business critical applications.

The transient phase for an application indicates the initial period when the application is moved to production after being constructed or after a major enhancement or during vendor transition. Additional FTE required for transient phase indicates the total number of additional FTEs to be employed during the transient phase alone. Once the application reaches steady state the additional FTEs can be removed. The one or more parameters to be considered at bundle level for additional FTEs required for transient phase are as:

Support team's business experience;
Support team's average tool/technology experience;
Number of applications of considerable large size;
Application bundle stability;
Necessity of multi-location support; and
Number of business critical applications.

Furthermore, the FTE estimation module (114) of the system (100) is also configured to generate the unutilized effort for one or more managed services production support engagements. Hence, at the time of project planning for one or more managed services production support engagements the FTEs can be shared among the application bundles for optimum utilization of the effort.

In yet another embodiment, the optimization of FTE at bundle level is performed taking in account the impact of support window. For example, if there are 3 application which all require 24*7 continuous support then individually each of the application would require a minimum of 5 FTE for supporting the application. So in total 15 FTE are required for supporting them individually even though total ticket volume for all the applications taken together may warrant much less FTE than 15. When these applications are grouped in a bundle, then an optimization is done based on an implicit assumption that the FTEs supporting the entire bundle can support any application that is part of the bundle. So now, in total, only 5 FTEs at minimum would be required for supporting the entire bundle instead of 15 as described above. The minimum FTE figure for a bundle will be over-ridden when total ticket volume for all the applications within the bundle warrants more than 5 FTEs.

It would be appreciated that a feedback loop is used to collect actual data in terms of overall ticket volume, their distribution, productivity impacting factors, effort adjustment factors, bundling criteria along with actual effort at the end of specified time period and utilize it to analyze the model effectiveness and refine the model as required. The feedback loop also helps to re-baseline the productivity which can be incorporated in the estimation engine for enhanced estimation.

In another example, where a user optionally provides the impact of L1 support if it is applicable to their scope. For this the user needs to list application or application bundle name, its description, Average number of L1 tickets per month and average handling time (AHT) in Person Hours (PH) for the same. AHT is multiplied with the L1 ticket volume to arrive at the base effort. This effort can be adjusted by other factors whose total impact is considered on top of base effort. This adjusted L1 effort along with the inputs of the number of working days a year, days spent in trainings and holidays, number of effective working hours per FTE per day and number of shifts to be supported is used to calculate the total L1 FTE.

In yet another embodiment of the disclosure, a method (200) illustrating steps involved for estimating size, effort and full time equivalent (FTE) of one or more managed services production support engagements as shown in FIG. 2. It receives one more tickets of each application of one or more managed services production support engagements and categories the received one or more tickets into one or more application bundles based on one or more set of parameters. The size of managed services production support engagements is represented in terms of production support points (PSP). The PSP calculated using ticket distributing indicates the normalized size derived from the number of incidence to be handled by a team at a definite time.

Initially at step (202), one or more tickets of each application of a plurality of applications of the one or more managed services production support engagements are received at a receiving module (106) at a predefined time interval.

In the next step at (204), the received one or more tickets are categorized into one or more application bundles at the categorization module (108) based on one or more predefined set of parameters. The one or more application bundles refer to a specific group or bucket of application that can be clustered together based on various business/tech-stack or portfolios of the organization. Once the one or more application bundles are created, the name of the application along with its brief description is listed. It is followed by the input of average number of one or more tickets within the definite time. It would be appreciated that the one or more tickets are being distributed in terms of very simple, simple, average, and complex. If in a particular case, the ticket distribution criteria is not given the system (100) may provide a default distribution.

In the next step at (206), estimating size of each application bundle of one or more application bundles at a size estimation module (110). The size of each application bundle is estimated based on a complexity distribution of the one or more tickets, computation of normal size of each ticket and weightage allocation to each ticket of one or more application bundles. The size estimation module provides application wise normalized size in productivity support points (PSP), base productivity (PSP/Persons Hours), adjusted productivity (PSP/persons hours), base effort per month (Person Hours), adjusted productivity (Person Hours) and a steady state FTE.

In the next step at (208), estimating efforts for one or more managed services production support engagements at an effort estimation module (112) based on the estimated size of the one or more managed services production support engagements and productivity of the each person of the team. The efforts are calculated in Person Hours. The productivity of each person of the team in size delivered per person hour depending on a plurality of factors such as one or more static factors, one or more common factors, one or more project specific characteristics, and one or more risk factors.

The productivity of each person of the team is depend on primary productivity determining factors and secondary productivity determining factors. The primary productivity determining factors depend on the application platform being supported. Some of the possible the application platform includes client server, mainframe or legacy, web based, enterprise resource planning (ERP) or package.

Furthermore, the overall effort estimation considers the addition effort due to static factors, common factors, project specific characteristics and risk factors in Person Hours at the deal level. The effort of the static factors must be considered in terms of absolute effort in Person Hours. For the other factors, namely common factors, project specific characteristics and risk, the effort is considered as a percentage of the base effort. The total adjusted effort arising out of the effort adjustment is apportioned into different applications in the ratio of their base efforts. It would be appreciated that these factors are only considered at the application level, however, the effort estimation module (112) also considers one or more factors which impact only at the application bundle level, such as a change request (CR), a database monitoring system and a system monitoring. The impact of the this cumulative effort is converted to FTE using working days and hours specified in the input and the resultant FTE is added to derive the final FTE count.

In the next step at (210), estimating FTE count for one or more managed services production support engagements at a FTE estimation module (114) using estimated size and effort for one or more managed services production support engagements, service level agreement (SLA) of each project and one or more steady state factors and one or more transient state factors as applicable for each application. The one or more steady state factors including number of working days per year, number of days spent in training and holidays per year, effective working hours of each FTE per day, and expected support window as applicable for the application to be supported. Further, the one or more transient state factors including business experience of the one or more persons of a support team, number of applications of considerably larger size, and necessity of multi-location support to the application.

The transient phase for an application indicates the initial period when the application is moved to production after being constructed or after a major enhancement or during vendor transition. Additional FTE required for transient phase indicates the total number of additional FTEs to be employed during the transient phase alone. Once the application reaches steady state the additional FTEs can be removed. The one or more parameters to be considered for additional FTEs required for transient phase are as:

Support team's business experience;
Support team's average tool/technology experience;
Number of applications of considerable large size;
Application bundle stability in a scale of 5 (1 means very unstable and 5 means most stable)
Necessity of multi-location support.

Furthermore, the FTE estimation also takes in account the unutilized effort in one or more managed services production support engagements. Hence, at the time of project planning for one or more managed services production support engagements the FTEs can be shared among the application bundles for optimum utilization of the effort.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method that estimates size, effort and FTE of software Managed Services Production Support (MS-PS) engagements. It provides a method and system to categorize all applications in various bundles based on multiple parameters. Further the disclosure provides a method and system to estimates size of each bundle at an application level based on a set of variables. Further, the disclosure provides a method and system for utilizing the estimated MS-PS engagement size and organizational baseline productivity information for estimating the MS-PS engagement base effort which can then be adjusted based on multiple factors to arrive at the final effort. It estimates full time equivalent (FTE) of the MS-PS engagement using the final estimated effort of the applications and additional FTE impacting parameters. Furthermore it provides a method and system to optimize the estimated FTE for a bundle and view the overall unutilized effort.

The embodiments of present disclosure herein addresses unresolved problem of effective estimation techniques in the managed services production support engagements dealing with support and maintenance of multiple applications in the information technology (IT) industry. There are large and cumbersome data input datasheets with too many variable and influencing parameters making it less user friendly. Turnaround time of the estimation process is significantly incomprehensive in nature of the existing templates. Further, in the existing templates high people dependency in absence of any standard set of rules and guidelines. It seems that the existing state of the art possess various challenges while estimating the managed services production support engagements.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A system for estimating full time equivalent (FTE) count for one or more managed services production support engagements, the system comprising:
a memory storing instructions;
one or more hardware processors communicatively coupled with the memory, wherein the one or more hardware processors are configured by the instructions to execute modules comprising:
a receiving module configured to receive one or more tickets of each of a plurality of applications at a predefined time interval, wherein the plurality of applications is from one or more managed services production support engagements;
a categorization module configured to categorize the received one or more tickets of each application of the plurality of applications into one or more application bundles based on one or more predefined set of parameters;
a size estimation module configured to estimate size of each of the one or more application bundles based on a complexity distribution of the one or more tickets, a normalized size computation and weightage allocation to each ticket of the one or more application bundles, wherein the weightage is allocated to each ticket based on corresponding turnaround time and wherein normalized size indicates a normalized size derived from a number of incidences to be handled by a team at a definite time;
an effort estimation module configured to estimate efforts of each of one or more managed services production support engagements, by:
estimating size of each of the one or more managed services production support engagements; and
analyzing productivity of the team in size delivered per person hour depending on a plurality of factors considering one or more static factors, one or more common factors, one or more project specific characteristics, and one or more risk factors in person hours, wherein the productivity of the team depends on primary productivity determining factors and secondary productivity determining factors, wherein the primary productivity determining factors depend on an application platform and the secondary productivity determining factors depend on attributes of an organization, wherein the effort for the one or more managed services production support engagements is estimated either at each application level or optimized at an application bundle level and wherein the effort is apportioned into different applications in a ratio of corresponding base efforts; and
a full time equivalent (FTE) estimation module configured to estimate FTE count for each of the one or more managed services production support engagement using the estimated size of each application bundle and the estimated effort for each of the one or more managed services production support engagements, service level agreement (SLA) of each of the plurality of applications, one or more steady state factors, one or more transient state factors as applicable for each application and unutilized effort in the one or more managed services production support engagements, wherein the FTE count is shared among each application bundle for optimizing utilization of the unutilized effort;
wherein the FTE estimation module is further configured to perform optimization of the FTE count at bundle level based on impact of support window as applicable for each application to be supported,
wherein the FTE estimation module is further configured to generate the unutilized effort for the one or more managed services production support engagements;
wherein the FTE count estimation is refined, by analyzing actual data that is collected using a feedback loop at the end of a specified time period, wherein the feedback loop re-baseline the productivity for enhanced estimation of the FTE count and wherein the actual data collected includes overall ticket volume, complexity distribution of tickets, productivity impacting factors, effort adjustment factors, bundling criteria along with actual effort.

2. The system of claim 1, wherein the size of one or more managed services production support engagements is represented in terms of production support points (PSP).

3. The system of claim 1, wherein the effort for one or more managed services production support engagements is represented in terms of person hours (PH).

4. The system of claim 1, wherein the primary productivity determining factors and the secondary productivity determining factors include application support platform, incident resolving process maturity, impact of known error database (KEDB) for incident resolution of the application, level of documentation available on each application, change management process and tool maturity.

5. The system of claim 1, wherein the one or more steady state factors include number of working days per year, number of days spent in training and holidays per year, effective working hours of each FTE per day, and expected support window as applicable for the application to be supported.

6. The system of claim 1, wherein the one or more transient state factors include business experience of one or more persons of a support team, number of applications of considerably larger size, and necessity of multi-location support to the application.

7. A method for estimating full time equivalent (FTE) count for one or more managed services production support engagements, the method comprising:
receiving one or more tickets of each of a plurality of applications at a receiving module at a predefined time interval, wherein the plurality of applications is from one or more managed services production support engagements;
categorizing the received one or more tickets of each application of the plurality of applications into one or more application bundles at a categorization module based on one or more predefined set of parameters;
estimating a size of each of the one or more application bundles at a size estimation module based on a complexity distribution of the one or more tickets, a normalized size computation and weightage allocation to each ticket of the one or more application bundles, wherein the weightage is allocated to each ticket based on corresponding turnaround time and wherein normalized size indicates a normalized size derived from a number of incidences to be handled by a team at a definite time;
estimating efforts of each of the one or more managed services production support engagements at an effort estimation module, by:
estimating size of each of the one or more managed services production support engagements; and
analyzing productivity of the team in size delivered per person hour depending on a plurality of factors considering one or more static factors, one or more common factors, one or more project specific characteristics, and one or more risk factors in person hours, wherein the productivity of the team depends on primary productivity determining factors and secondary productivity determining factors, wherein the primary productivity determining factors depend on an application platform and the secondary productivity determining factors depend on attributes of an organization, wherein the effort for the one or more managed services production support engagements is estimated either at each application level or optimized at an application bundle level and wherein the effort is apportioned into different applications in a ratio of corresponding base efforts;
estimating full time equivalent (FTE) count for each of the one or more managed services production support engagements at the FTE estimation module using the estimated size of each application bundle and the estimated effort for each of the one or more managed services production support engagements, service level agreement (SLA) of each of the plurality of applications, one or more steady state factors, one or more transient state factors as applicable for each application and unutilized effort in the one or more managed services production support engagements, wherein the FTE count is shared among each application bundle for optimizing utilization of the unutilized effort;
performing optimization of the FTE count at bundle level based on impact of support window as applicable for each application to be supported;
generating unutilized effort for the one or more managed services production engagements;
and
refining the FTE count estimation, by analyzing actual data that is collected using a feedback loop at the end of a specified time period, wherein the feedback loop re-baseline the productivity for enhanced estimation of the FTE count and wherein the actual data collected includes overall ticket volume, complexity distribution of tickets, productivity impacting factors, effort adjustment factors, bundling criteria along with actual effort.

8. The method of claim 7, wherein the primary productivity determining factors and the secondary productivity determining factors include application support platform, incident resolving process maturity, impact of known error database (KEDB) for incident resolution of the application, level of documentation available on each application, change management process and tool maturity.

9. The method of claim 7, wherein the one or more steady state factors include number of working days per year, number of days spent in training and holidays per year, effective working hours of each FTE per day, and expected support window as applicable for the application to be supported.

10. The method of claim 7, wherein one or more transient state factors include business experience of the one or more persons of a support team, number of applications of considerably larger size, and necessity of multi-location support to the application.

11. A non-transitory computer medium storing one or more instructions which when executed by at least one processor on a system, cause the at least one processor to perform method for estimating full time equivalent (FTE) count for one or more managed services production support engagements, the one or more instructions comprising:
receiving one or more tickets of each of a plurality of applications at a receiving module at a predefined time interval, wherein the plurality of applications is from one or more managed services production support engagements;
categorizing the received one or more tickets of each application of the plurality of applications into one or more application bundles at a categorization module based on one or more predefined set of parameters;
estimating size of each of the one or more application bundles at a size estimation module based on a complexity distribution of the one or more tickets, a normalized size computation and weightage allocation to each ticket of the one or more application bundles, wherein the weightage is allocated to each ticket based on corresponding turnaround time and wherein normalized size indicates a normalized size derived from a number of incidences to be handled by a team at a definite time;
estimating efforts of each of the one or more managed services production support engagements at an effort estimation module, by:
  estimating size of each of the one or more managed services production support engagements; and
  analyzing productivity of the team in size delivered per person hour depending on a plurality of factors considering one or more static factors, one or more common factors, one or more project specific characteristics, and one or more risk factors in person hours, wherein the productivity of the team depends on primary productivity determining factors and secondary productivity determining factors, wherein the primary productivity determining factors depend on an application platform and the secondary productivity determining factors depend on attributes of an organization, wherein the effort for the one or more managed services production support engagements is estimated either at each application level or optimized at an application bundle level and wherein the effort is apportioned into different applications in a ratio of corresponding base efforts;
estimating full time equivalent (FTE) count for each of the one or more managed services production support engagements at the FTE estimation module using the estimated size of each application bundle and the estimated effort for each of the one or more managed services production support engagements, service level agreement (SLA) of each of the plurality of applications, one or more steady state factors, one or more transient state factors as applicable for each application and unutilized effort in the one or more managed services production support engagements, wherein the FTE count is shared among each application bundle for optimizing utilization of the unutilized effort;
performing optimization of the FTE count at bundle level based on impact of support window as applicable for each application to be supported;
generating unutilized effort for the one or more managed services production engagements; and
refining the FTE count estimation, by analyzing actual data that is collected using a feedback loop at the end of a specified time period, wherein the feedback loop re-baseline the productivity for enhanced estimation of the FTE count and wherein the actual data collected includes overall ticket volume, complexity distribution of tickets, productivity impacting factors, effort adjustment factors, bundling criteria along with actual effort.

* * * * *